United States Patent [19]
Nozick

[11] Patent Number: 5,176,534
[45] Date of Patent: Jan. 5, 1993

[54] LOW-CURRENT RECEPTACLE FOR PREWIRING A BUILDING

[76] Inventor: Jacques Nozick, 28, rue Broca, 75005 Paris, France

[21] Appl. No.: 785,063

[22] Filed: Oct. 30, 1991

[30] Foreign Application Priority Data

Oct. 31, 1990 [FR] France ............................. 90 13564

[51] Int. Cl.⁵ .............................................. H01R 4/24
[52] U.S. Cl. .................................. 439/402; 439/651; 439/695
[58] Field of Search ................... 439/395–407, 439/638, 639, 640, 707–715, 535, 536, 540, 676, 650–655

[56] References Cited
U.S. PATENT DOCUMENTS

| | | | |
|---|---|---|---|
| 4,725,249 | 2/1988 | Blackwood et al. | 439/535 |
| 4,964,812 | 10/1990 | Siemon et al. | 439/403 |
| 5,007,860 | 4/1991 | Robinson et al. | 439/535 |
| 5,055,067 | 10/1991 | Field | 439/540 |

FOREIGN PATENT DOCUMENTS 0100802 8/1984 European Pat. Off. .
02190 3/1988 PCT Int'l Appl. .

Primary Examiner—David L. Pirlot
Attorney, Agent, or Firm—Sughrue, Mion, Zinn, Macpeak and Seas

[57] ABSTRACT

Low-current receptacles for prewiring a building comprise:
- a fixed base provided with a first intermediate connector connected to a cable of the prewired network; and
- a removable external adaptor housing provided with a second intermediate connector complementary to said first intermediate connector and connected to user apparatus.

15 Claims, 5 Drawing Sheets

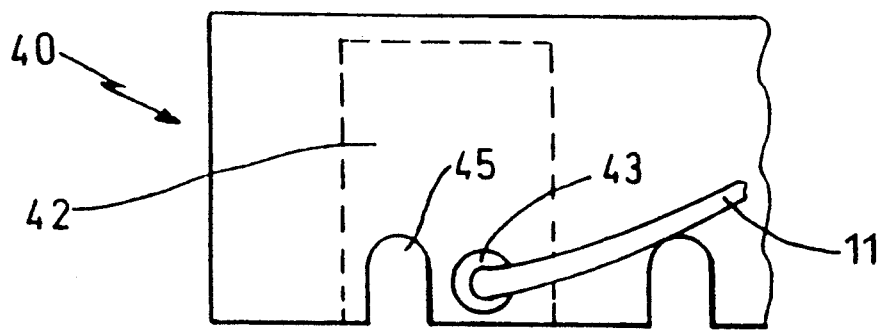
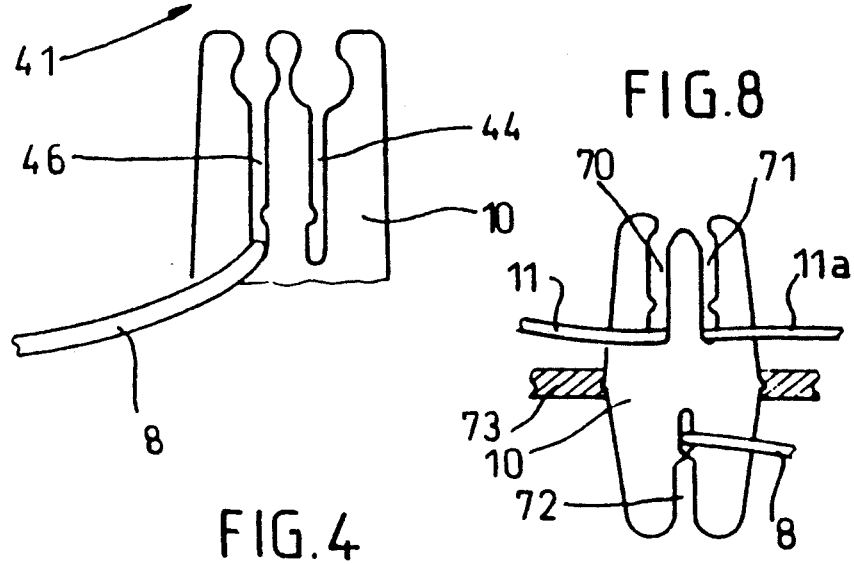
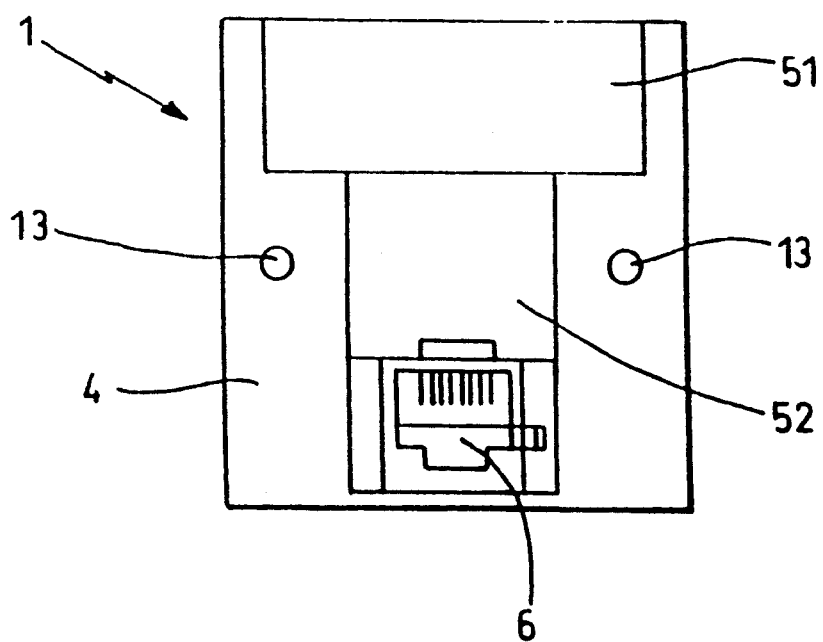

LOW-CURRENT RECEPTACLE FOR PREWIRING A BUILDING

The present invention relates to low-current receptacles for prewiring a building.

BACKGROUND OF THE INVENTION

Low-current prewiring of a building consists in providing it, preferably while it is being built, with a network of communications cables and receptacles that can be adapted over a long period of time (e.g. fifty years) to connecting all types of equipment that need to communicate internally or externally such as telephones, computer or other terminals, controllers for technical control of the building, image transmission apparatuses, etc., with this being possible throughout the building.

To do this, the prewired network must be laid systematically throughout the building so that each room includes one or more connection receptacles each provided with at least one connector. A major technical problem is standardizing the receptacles, given the wide variety of low current connectors that exist on the market: it has been estimated that there are more than twenty different types of connector, and other types of connector will doubtless appear in the years to come.

In the past, receptacles have been connected to cables in the prewired network (generally four-pair cables or dual four-pair cables, or other types of cable), in one of the three following ways:

1. Direct connection of specific receptacles for a connector: each receptacle connector is connected directly to the cables of the prewired network. Under such circumstances, it is necessary to change the receptable and to wire in a new receptacle should it ever become necessary to connect equipment having a connector that does not correspond to the connector in the receptacle that is already installed.

2. An intermediate contact strip is used having its contacts connected to the conductors of a cable in the prewired network and also to conductors connecting said contacts to a specific receptable of a connector: it is still necessary to change the receptacle and to perform new wiring if it becomes necessary to use a connector other than that which corresponds to the receptacle, but rewiring is facilitated and made quicker by the contact strip, particularly if its contacts are insulation-displacement contacts.

3. The prewired network is connected to a single type of specific intermediate connector situated inside the housings of the receptacles. The housings of the receptacles thus contain interface connectors which plug in to said intermediate connectors and enable different types of apparatus to be connected to the prewired network. When a new type of apparatus having a different type of connector is to be connected to the network, it is necessary to change the interface connector, but such a change is very quick since it is done merely by plugging in a new connector on the intermediate connector and there is no need to alter the wiring.

Document WO 88/02 190 describes a typical example of solution 3 above. However, such receptacles suffer from several drawbacks. Firstly, the intermediate connector is specific to a particular manufacturer and is specifically designed to be used as an intermediate connector in a receptacle. As a result it is made in relatively small numbers and is thus relatively expensive. In addition, the receptacle is specifically adapted to receive "modular jack" type interface connectors which are small in size. Because said interface connectors are situated inside the housing of the receptacle, there is no way in which they can be replaced by bulkier interface connectors. As a result, if it is necessary to connect apparatus fitted with a bulkier connector to the prewired network, it is necessary to dismantle the entire receptacle and replace it with a receptacle provided with the desired connector. Moreover, the receptacle disclosed in Document WO 88/02 190 needs to be dismantled whenever an interface connector is to be replaced, and this can lead to said receptacle being damaged.

An object of the present invention is to solve these technical problems.

SUMMARY OF THE INVENTION

The present invention provides a low-current receptacle for prewiring a building, the receptacle comprising:
- a fixed base including a front portion provided with a first intermediate connector connected to a cable of a prewired network, said cable being provided with a plurality of conductors; and
- a removable external adaptor housing including a rear portion suitable for fixing over the front portion of the base, said rear portion being provided with a second intermediate connector complementary to said first intermediate connector and being adapted to connect to said first intermediate connector when the adaptor housing is fixed on the base, said adaptor housing also including an electrical device connected to said second intermediate connector to communicate with the prewired network.

Advantageously, the base includes two-slot insulation-displacement contacts and conductors connected to said first intermediate connector, each insulation-displacement contact being adapted to receive a conductor connected to the first intermediate connector and one of the conductors of the cable. In another variant, the base includes three-slot insulation-displacement contacts and conductors connected to said first intermediate connector, each insulation-displacement contact being adapted to receive a conductor connected to the first intermediate connector and a conductor of the cable, and each insulation-displacement contact being further adapted to receive a branch connector going to another receptacle. In both of these embodiments, it may be advantageous for the conductors of the cable to be fixed to a cap-tool which facilitates installing them on the base.

In an advantageous embodiment, the adaptor housing includes a front portion which is distinct from the rear portion of said adaptor housing and which is fixed to the rear portion, with said rear portion being independent of said electrical device.

The adaptor housing of the receptacle may also include two-slot insulation-displacement contacts connected firstly to conductors connected to the second intermediate connector and secondly to conductors connected to said electrical device.

Advantageously, the cable includes a screen drain, and said receptacle includes conduction means connecting said cable screen drain to the electrical device. In another particular embodiment, the base and the adaptor housing are assembled together by screws, and said conduction means comprise a screw, a corresponding bushing, and an insulation-displacement contact in contact with said bushing, said cable screen drain being connected to said insulation-displacement contact and a conductor connecting the screw to said electrical device.

The base may include a shutter for shutting the first intermediate connector.

Advantageously, said first and second intermediate connectors are standard connectors, e.g. of the "modular jack" type.

In a particularly advantageous embodiment, one of said first and second intermediate connectors is a "modular jack" type male connector including a resiliently locking tongue, and said receptacle includes means for retracting said resiliently locking tongue and for making it inoperative so that said first and second intermediate connectors may be decoupled merely by relative sliding.

In another embodiment, one of said first and second intermediate connectors is a "modular jack" type male connector normally including a resiliently locking tongue and modified so as to no longer include said resilient locking tongue, thereby enabling said first and second intermediate connectors to be decoupled merely by relative sliding.

The electrical device which includes the adaptor housing and which communicates with the prewired network may be a connector accessible from the outside, a cable, or a sensor.

BRIEF DESCRIPTION OF THE DRAWINGS

An embodiment of the invention is described by way of example with reference to the accompanying drawings, in which:

FIG. 3 is a diagrammatic detail view showing how cable conductors are installed by means of a cap-tool;

FIG. 4 is a front view of the base shown in FIGS. 1 and 2;

FIG. 8 is a diagrammatic view of a variant insulation-displacement contact usable in the base of a receptacle of the invention.

DETAILED DESCRIPTION

Figure 1:
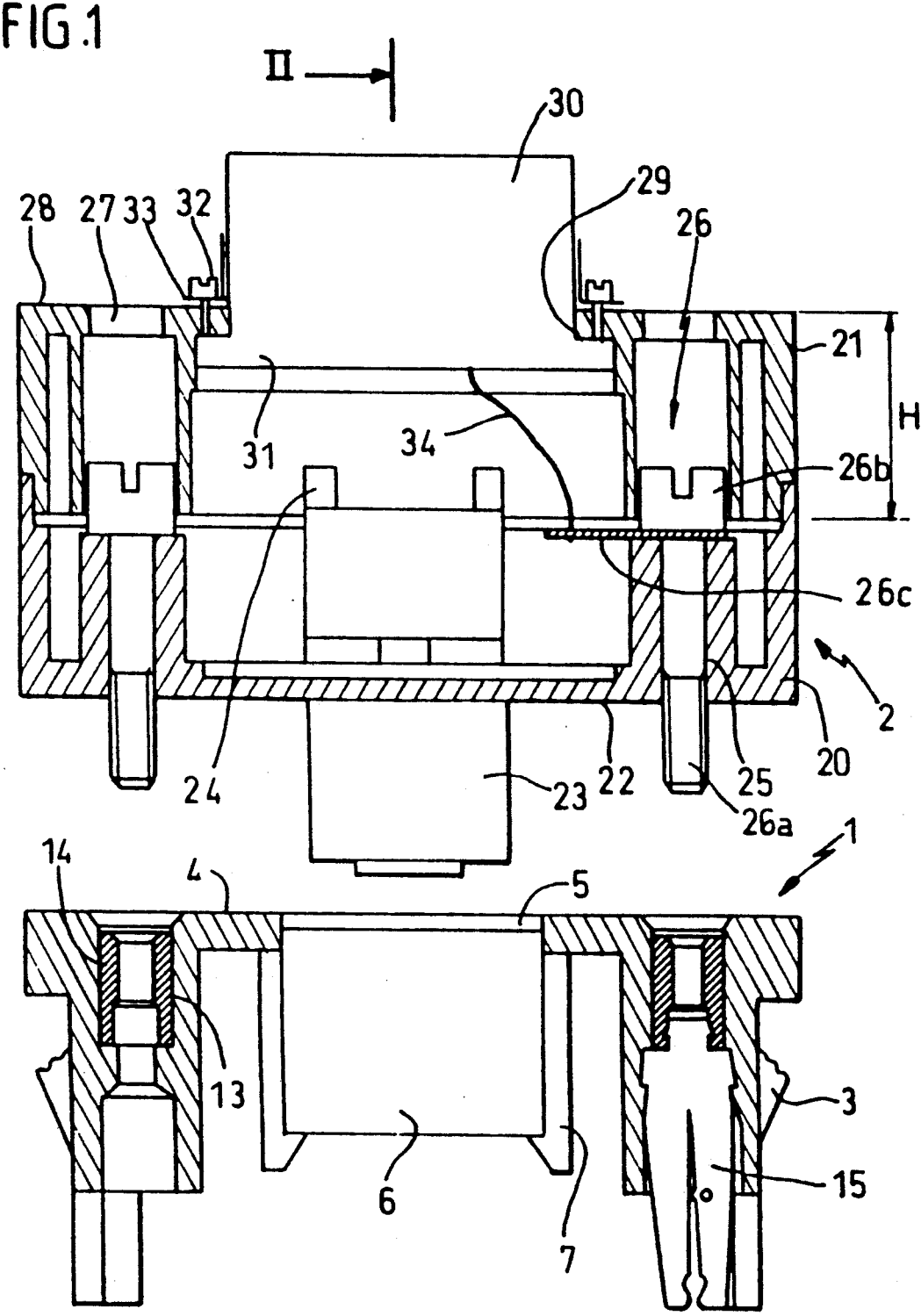
FIG. 1 is a section view on line I—I of FIG. 2 though a receptacle constituting a particular embodiment of the invention.

With reference to FIG. 1, a low current receptacle of the invention comprises a base 1 and an adaptor housing 2. These two parts are generally made of molded plastic, but they could be made differently without going beyond the scope of the invention.

The base 1 is generally received in a connection housing (not shown) fixed to the wall or to a terminal or placed in a false floor. The base 1 of the connection housing may be fixed, for example, by means of resilient snap-fastening lugs 3 on the base 1.

The base 1 has a front face 4 which is the only one of its faces to be visible from the outside when the base 1 is snapped onto the connection housing, and which is provided with an opening 5 occupied by an intermediate connector 6 (female type in this case) which extends into the connection housing from the front face 4, and which is fixed to the base 1, e.g. by snap-fastening using resilient arms 7. In a variant, the intermediate connector 6 may be molded directly to the front face 4 of the base 1.

The connector 6 is a standard communications connector, i.e. it is a male or female connector satisfying a standard or a type that is widely used and suitable for connection to external apparatus by means of a complementary connector connected to said apparatus. When said connector 6 happens to correspond to the connector of external apparatus that is to be connected to a prewired network, it would be possible to make do without the adaptor housing 2, and this may represent a considerable saving if the connector 6 is of a type that is in wide use.

For example, the intermediate connector 6 could be of a type generally referred to as a "modular jack" and sometimes as "RJ 45" or "miniature jack", and which has been adopted by the "US Federal Communication Commission" as a standard connector for connecting telephone equipments to telephone lines (Code of Federal Regulations—47 CFR, part 68, subpart F—Connectors). This type of connector has also been chosen in ISO standard 8877 for obtaining access to the integrated services digital network (ISDN). It generally comprises 4, 6, or 8 contacts. In the embodiment of the invention described herein, the "modular jack" connector 6 used has eight contacts, but this characteristic should not be taken as being limiting in any way.

Figure 5:
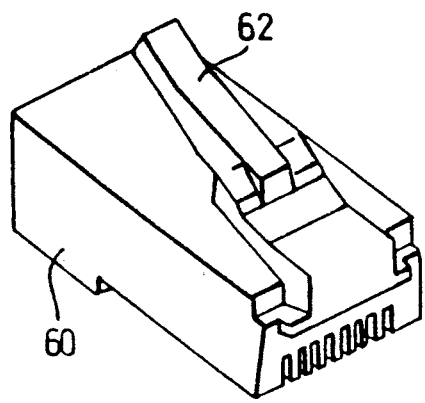
FIGS. 5 and 6 are diagrammatic views showing male and female "modular jack" type connectors, respectively.
Figure 6:
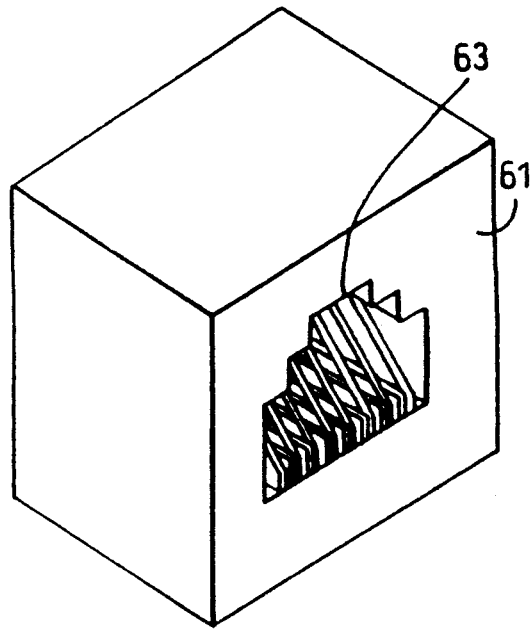

FIGS. 5 and 6 are diagrams respectively showing a male type "modular jack" connector and a female connector of the same type. The male connector 60 includes a resilient locking tongue 62 adapted to snap into a recess 63 in the female connector 61 when the male connector is plugged into the female connector.

Figure 2:
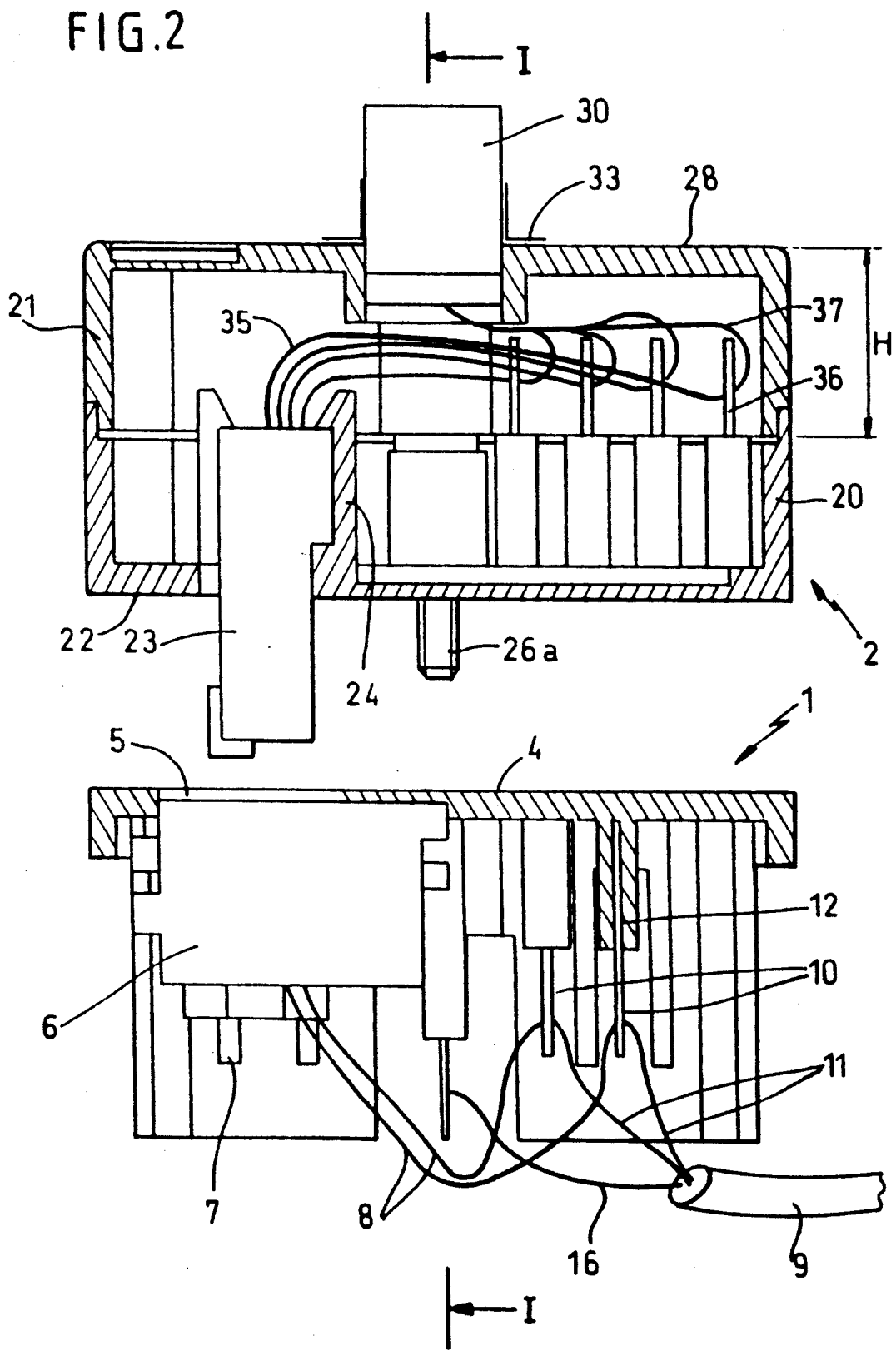
FIG. 2 is a section view on line II—II of FIG. 1 of the receptacle shown in FIG. 1.

With reference to FIG. 2, in the particular embodiment shown herein, the connector 6 is connected to four pairs of conductors 8 with only two of the conductors 8 being shown in FIG. 2 for reasons of clarity. The four pairs of conductors 8 may come directly from a cable 9 in the prewired network. Alternatively, and more advantageously, the eight conductors 8 may be connected respectively to eight two-slot insulation-displacement contacts 10, such as the insulation-displacement contacts described in French patent application No. 90 8502 filed Jul. 4, 1990, for example, and then in turn the eight conductors 11 of the cable 9 are connected to the eight insulation-displacement contacts 10. Only two conductors 11 are shown in FIG. 2 for reasons of clarity.

The two-slot insulation-displacement contacts 10 are fixed to the base 1, e.g. by being a force-fit in housings 12 provided in the base 1 and substantially complementary in shape to the insulation-displacement contacts 10. The advantage of using two-slot insulation-displacement contacts 10 rather than connecting the conductors 11 of the cable 9 directly to the connector 6 lies in the fact that this makes it possible to change the order in which the wires are connected on request (distribution frame function).

Advantageously, the conductors 11 of the cable 9 are installed using a cap-tool 40 shown diagrammatically in FIG. 3 and described in detail in Document EP-0 100 802. With reference to FIG. 3, the cap-tool 40 is a molded piece of plastic adapted to fit over the insulation-displacement contacts 10. For this purpose, the cap-tool 40 includes recesses 41 that are adapted to receive the insulation-displacement contacts 10. The recesses 41 are delimited laterally by two side walls 42 of the cap-tool 40. For each recess, the side walls 42 include two holes 43 that are in alignment and that serve to pass one conductor 11 of the cable 9 and to insert said conductor 11 into an insulation-displacement slot 44 of an insulation-displacement contact 10 when said cap-tool 40 is placed over said insulation-displacement contact 10. For each recess, the side walls 42 also include two aligned notches 45 which fit astride a conductor 8 coming from the intermediate female connector 6 and already inserted in the second insulation-displacement slot 46 of said insulation-displacement contact 10. Thus, the eight conductors 11 of the cable 9 can be inserted simultaneously and quickly onto the eight insulation-displacement contacts 10, thereby avoiding any risk of accidentally putting one of the conductors 11 into a slot 46 that already contains a conductor 8 which can give rise to poor contact. In addition, the cap-tool 40 remains in place after the conductors have been inserted, and participates in holding the conductors in the insulation-displacement contacts 10.

As shown in FIG. 1, the base 1 also includes two bores 13 opening out into its front face 4. Each bore 13 receives an internally tapped bushing 14 as a force-fit for a purpose described below. In addition, a single slot insulation-displacement contact 15 is inserted as a force-fit into one of the bushings 14 and serves to receive a screen drain conductor 16 of the cable 9 which is connected to ground (see FIG. 2).

As shown in FIG. 4, front face 4 of the base 1 may include a transparent label carrier 51. Advantageously, a shutter 5 may slide over the front face 4 between a low position in which it closes the intermediate female connector 6 and a high position in which it allows a complementary male connector to be plugged into the intermediate female connector 6. The intermediate female connector 6 is thus protected from possible environmental attack, e.g. in the form of dust, shock, etc. . . . .

The adaptor housing 2 comprises two portions 20 and 21 assembled together by any known means, e.g. by snap-fastening, by ultrasonic welding, or by glue. One of the two portions 20 of the adaptor housing 2 includes a rear face 22 whose external shape is identical to that of the front face 4 of the base 1, and which is placed to face the front face 4 of the base 1 when the adaptor housing 2 is assembled on the base 1, whereas the other portion 21 has a front face 28. The rear face 22 includes an opening which passes an intermediate connector corresponding to the connector 6, advantageously a "modular jack" type connector 23, which projects out from the adaptor housing 2. The intermediate connector 23 is fixed to the adaptor housing 2 by snap-fastening arms 24 and by abutment against the rear face 22 of said housing 2.

In one embodiment of the invention, the connector 23 is a "modular jack" type male connector, but it does not include the resilient locking tongue 62, unlike the "modular jack" type male connectors that are normally commercially available, thereby making it possible to slide it freely into the intermediate female connector 6 of the base 1: eliminating the said resilient snap-fastening device is a modification that is relatively inexpensive, and does not make the receptacle significantly more expensive.

Figure 7:
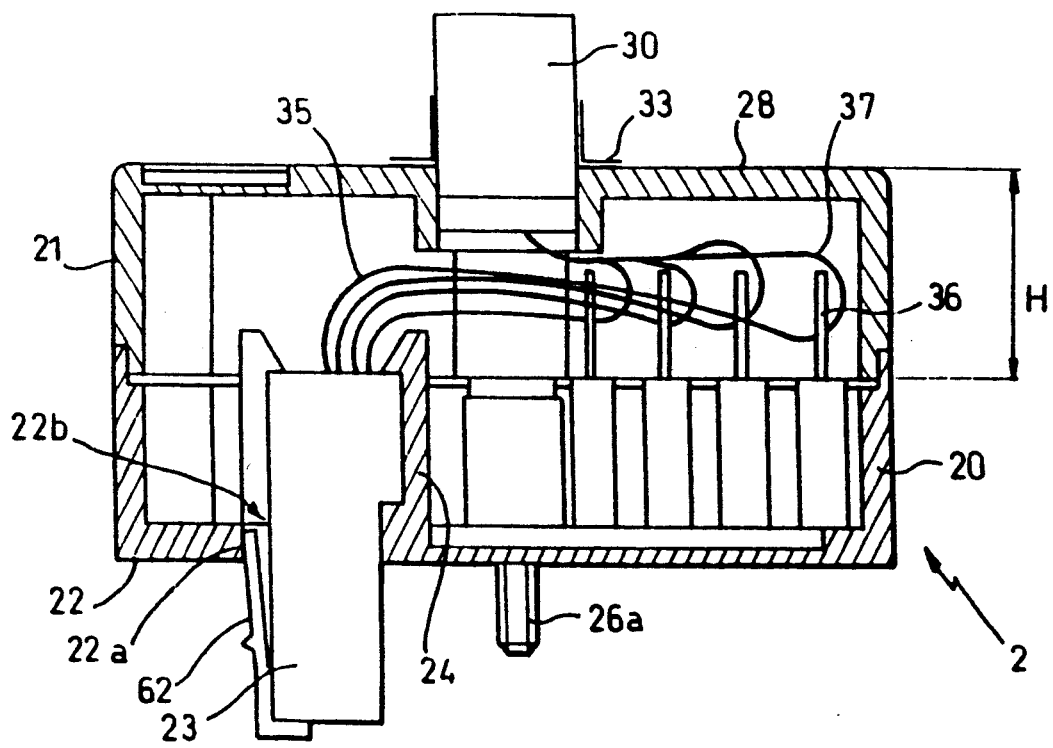
FIG. 7 is a section view through a variant of the adaptor housing of FIGS. 1 and 2.

In another advantageous embodiment of the invention, the connector 23 is a "modular jack" type male connector which includes a locking tongue 62 as shown in FIG. 7, but the adaptor housing 2 is adapted to retract said locking tongue 62. For example, one edge 22a of the opening 22b formed through the rear face of the housing 2 to pass the connector 23 bears permanently against the tongue 62 so as to make it inoperative. The connector 23 can thus slide freely in the connector 6. It is thus possible to use a "modular jack" male connector 23 that is not modified.

With reference to FIG. 1, the portion 20 of the adaptor housing 2 also includes two bores 25 facing the bushings 14 in the base 1. Each bore has the threaded shank 26a of a screw 26 passing therethrough. The screw 26 includes a head 26b that is larger than the bore 25 and that is received inside the adaptor housing 2. The adaptor housing 2 can thus be installed on the base 1 by fitting the intermediate male connector 23 in the intermediate female connector 6 and by screwing the screws 26 into the bushings 14 in the base 1 so as to fix the adaptor housing 2 on the base 1. To make this possible, the front face 28 of the adaptor housing 2 is provided with two orifices 27 giving access to the heads 26b of the screws 26 to a screwdriver. One of the screws 26 has a contact tab 26c which is clamped between said screw 26 and the portion 20 of the adaptor housing 2 when the screw 26 is screwed tight into the bushing 14.

The front face 28 of the adaptor housing 2 also includes an opening 29 which allows an external connector 30 to pass therethrough, and to which a complementary connector of apparatus for connection to the pre-wired network can be plugged: the external connector 30 may be of any type, e.g. a 9-pin SUBD connector, a 15-pin SUBD connector, a 25-pin SUBD connector, a 5-pin DIN connector, a coaxial cable connector, etc. It may be a purely electrical connector, or a combined electrical and optical connector if it used as an interface with an optical cable.

When it is desired to connect apparatus to the receptacle that requires an external connector 30 which is different from an existing external connector 30, it suffices merely to unscrew the screws 26 and to replace the adaptor housing 2 with a new adaptor housing 2 having the appropriate external connector. Such replacement is easy and quick and does not require any handling of electrical conductors: there is thus no danger of making poor contacts. In addition, screwing the adaptor housing 2 to the base 1 ensures that the receptacle is mechanically strong and that the two coupled-together intermediate connectors 6 and 23 are never subjected to mechanical stress.

The way in which the external connector 30 is fixed to the adaptor housing 2 is specific to each type of connector. For example, as shown in FIG. 1, the external connector 30 may comprise an enlarged base 31 received inside the adaptor housing 2 and incapable of passing through the opening 29 in its front face 28: the enlarged base 31 is held in abutment against the front face 28 of the adaptor housing 2 by two screws 32. A metal endpiece 33 surrounding the external connector 30 may be interposed between the screws 32 and the front face 28. When the external connector 30 is cylindrical, the endpiece 33 may have internal tapping and may be screwed onto the external connector 30.

In general, the shape of the opening 29 in the adaptor housing 2 and the thickness H of the portion 21 of said adaptor housing 2 depend on the type of external connector 30 that is used. In contrast, the portion 20 of said adaptor housing 2 is independent of the external connector 30: as a result the portion 20 may be mass-produced at low cost.

There are various ways in which the external connector 30 may be electrically connected. Firstly, when the external connector 30 needs to be connected to ground, a conductor 34 may be connected both to a ground contact of the external connector 30 and to the contact tab 26c which is electrically grounded via the screw 26 holding the tab in place, the corresponding bushing 14, the one-slot insulation-displacement contact 15, and the screen drain conductor 16 of the cable 9. This disposition is advantageous since it avoids using male and female intermediate connectors 23 and 6 fitted with a ninth contact for ground: such intermediate contacts are more expensive than conventional eight-contact "modular jack" type connectors.

In addition, eight conductors 35 leave the male intermediate connector 23 in spite of only four conductors 35 being shown in FIG. 2 for reasons of clarity. These conductors 35 may be connected directly to the external connector 30. More advantageously, they may be connected on two-slot insulation-displacement contacts 36 fixed to the portion 20 of the adaptor housing 2, with other conductors 37 connecting the insulation-displacement contacts 36 to the external connector 30. This makes it possible firstly to use different color codes for the conductors 37 connected to the external connector 30 and to the conductors 35 connected to the male intermediate connector 23. But above all, this disposition makes it possible to have adaptor housing portions 20 which are prewired identically for a plurality of different external connectors, thus making it possible to prewire the portion 20 on a large scale thus reducing manufacturing costs. When assembling the adaptor housing 2, all that remains to be done is to connect the conductor 37 connected to the external connector 30 to the two-slot insulation-displacement contacts 36, and that is quick and easy.

In a variant, the conductors 35 which leave the male intermediate connector 23 may be connected to a printed circuit which is received inside the adaptor housing 2 and which is connected to the conductors 37 that come from the external connector 30. This disposition makes it possible to interpose active components such as a "Balun" between the connectors 23 and 30, i.e. transformers that enable a signal to be conveyed over a coaxial cable.

Figure 9:
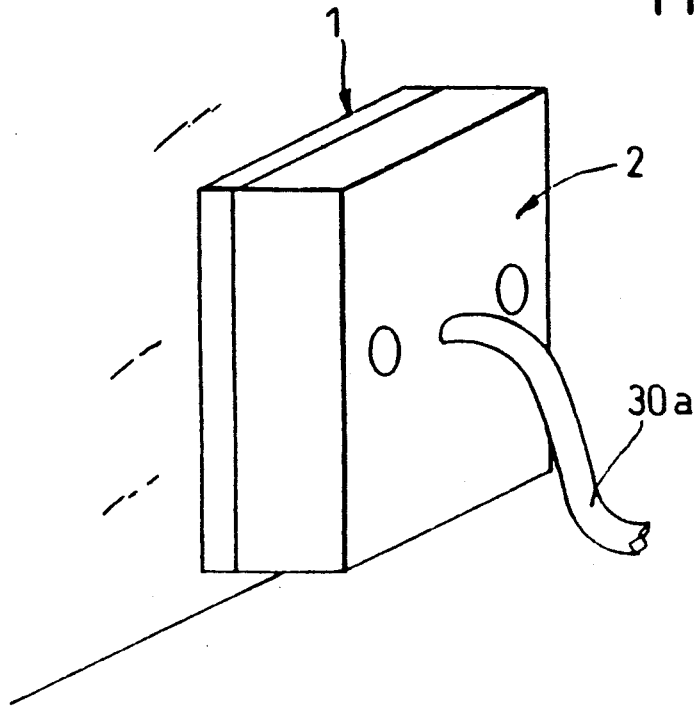
FIGS. 9 and 10 show variant receptacles of the invention.

The receptable of the invention may certainly be used to connect to apparatus having its own "modular jack" type male connector. Under such circumstances, the adaptor housing 2 may merely be removed, and the "modular jack" male connector of the apparatus may be plugged directly into the female intermediate connector 6 of the base 1. More advantageously, as shown in FIG. 9, the cord 30a of the apparatus may be connected directly to the male intermediate connector 23 of an adaptor housing 2 which in this case does not include an external connector 30, said cord being mechanically bonded to the adaptor housing 2. This disposition makes it possible to avoid damaging the "modular jack" male connector as may happen with a conventional male "modular jack" connector that is held in place merely by snap-fastening into a female connector, but which becomes much more difficult under the present circumstances where the "modular jack" male connector is secured to the housing 2 and the housing 2 is screwed to the base 1 which carries a female "modular jack" connector.

Figure 10:
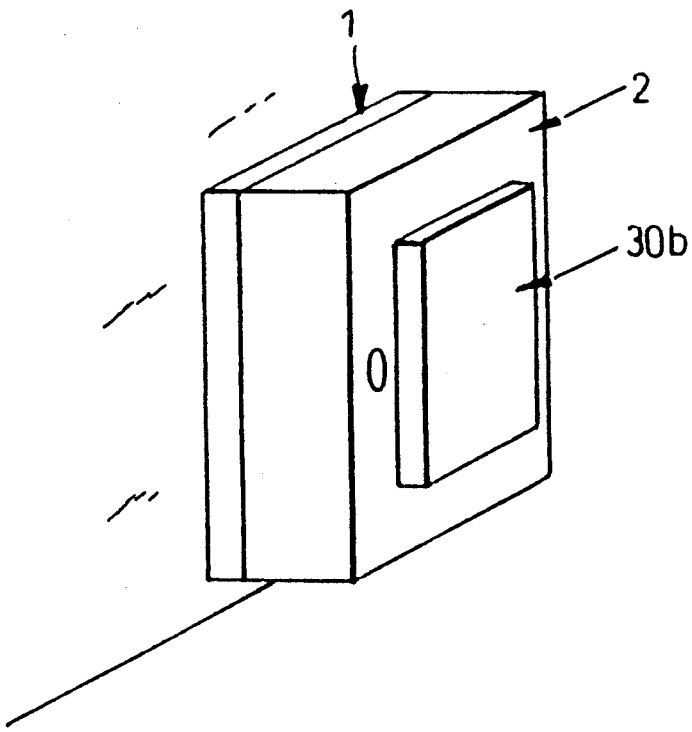

In another variant of the invention, shown in FIG. 10, the external connector 30 could be replaced by an apparatus 30b such as a temperature sensor, an intrusion detector (a sensor ultrasound, infrared, or radar, etc.) for an alarm system, or some other form of sensor. When the sensor in an intrusion detector for an alarm system, it is advantageous for the screws 25 to trigger the alarm if they are unscrewed: for example, the intrusion detector could be connected in series with at least one of the screws 26 and the bushing 14 into which it is screwed, so that contact is interrupted when the screw 26 is unscrewed from its bushing 14.

In another variant, the housing 2 need not include any screws 26 and the housing 2 may be fixed to the base by snap-fastening.

In another variant, the insulation-displacement contacts 10 of the base 1 have three slots, i.e. they are suitable for receiving three conductors each. For example, as shown in FIG. 8, the contacts 10 may have two slots 70 and 71 directed towards the rear of the base 1, and one slot 70 that may be directed towards the front face 4 of the base 1. The contact 10 may be fixed to the base 1 by any appropriate means, e.g. by snap-fastening or by being a force-fit in a wall 73 that may be integral with the base 1 or that may be applied to the base 1. Such three-slot contacts 10 are particularly advantageous in that they enable branch connections to be made from one receptacle to another. Thus, the front slot 72 of contacts 10 which is the least accessible since it is situated facing the front face 4 of the base 1 may receive a conductor 8 connected to the intermediate connector 6 of the base, with one of the rear slots 70 receiving a conductor 11 of the cable 9. When a branch receptacle is to be installed on the receptacle to which the contacts 10 belongs (referred to as the main receptacle), it suffices merely to connect conductors 11a in the slots 71 of each of the contacts 10 (or possible slots 71 of only some of the contacts 10) of the main receptacle, and to connect the same conductors 11a in the rear slots 70 of the corresponding contacts 10 in the branch receptacle. A further branch connection may be made from the first branch receptacle, etc.

I claim:

1. A low-current receptacle for prewiring a building, the receptacle comprising:

a fixed base including a front portion provided with a first intermediate connector connected to a cable of a prewired network, said cable being provided with a plurality of conductors; and a removable external adaptor housing including a rear portion suitable for fixing over the front portion of the base, said rear portion being provided with a second intermediate connector complementary to said first intermediate connector and being adapted to connect to said first intermediate connector when the adaptor housing is fixed on the base, said adaptor housing also including an electrical device connected to said second intermediate connector to communicate with the prewired network, wherein the adaptor housing includes conductors connected to the second intermediate connector, conductors connected to said electrical device, and two-slot insulation-displacement contacts, with each two-slot insulation-displacement contact being adapted to receive both a conductor connected to the second intermediate connector and a conductor connected to said electrical device.

2. A receptacle according to claim 1, wherein the adaptor housing includes a front portion which is distinct from the rear portion of said adaptor housing and which is fixed to the rear portion, with said rear portion being independent of said electrical device connected to the second intermediate connector, and wherein said two-slot insulation-displacement contacts are fixed to said rear portion of said adaptor housing.

3. A low-current receptacle for prewiring a building, the receptacle comprising:
   a fixed base including a front portion provided with a first intermediate connector connected to a cable of a prewired network, said cable being provided with a plurality of conductors; and
   a removable external adaptor housing including a rear portion suitable for fixing over the front portion of the base, said rear portion being provided with a second intermediate connector complementary to said first intermediate connector and being adapted to connect to said first intermediate connector when the adaptor housing is fixed on the base, said adaptor housing also including an electrical device connected to said second intermediate connector to communicate with the prewired network, wherein the cable includes a screen drain, and said receptacle includes conduction means connecting said cable screen drain to the electrical device, and wherein the base and the adaptor housing are assembled together by screws, and said conduction means comprise a screw, a corresponding bushing, and an insulation-displacement contact in contact with said bushing, said cable screen drain being connected to said insulation-displacement contact and a conductor connecting the screw to said electrical device.

4. A low-current receptacle for prewiring a building, the receptacle comprising:
   a fixed base including a front portion provided with a first intermediate connector connected to a cable of a prewired network, said cable being provided with a plurality of conductors; and
   a removable external adaptor housing including a rear portion suitable for fixing over the front portion of the base, said rear portion being provided with a second intermediate connector complementary to said first intermediate connector and being adapted to connect to said first intermediate connector when the adaptor housing is fixed on the base, said adaptor housing also including an electrical device connected to said second intermediate connector to communicate with the prewired network, wherein said first and second intermediate connectors are standard "modular jack" type connectors, and one of said connectors is a male connector including a resiliently locking tongue, and said receptacle includes means for retracting said resiliently locking tongue and for making it inoperative so that said first and second intermediate connectors may be decoupled merely by relative sliding.

5. A low-current receptacle for prewiring a building, the receptacle comprising:
   a fixed base including a front portion provided with a first intermediate connector connected to a cable of a prewired network, said cable being provided with a plurality of conductors; and
   a removable external adaptor housing including a rear portion suitable for fixing over the front portion of the base, said rear portion being provided with a second intermediate connector complementary to said first intermediate connector and being adapted to connect to said first intermediate connector when the adaptor housing is fixed on the base, said adaptor housing also including an electrical device connected to said second intermediate connector to communicate with the prewired network, wherein said first and second intermediate connectors are standard "modular jack" type connectors, and one of said connectors is a male connector normally including a resiliently locking tongue and modified so as to no longer include said resilient locking tongue, thereby enabling said first and second intermediate connectors to be decoupled merely by relative sliding.

6. A receptacle according to claims 3, 4 or 5, wherein the base includes two-slot insulation-displacement contacts and conductors connected to said first intermediate connector, each insulation-displacement contact being adapted to receive a conductor connected to the first intermediate connector and one of the conductors of the cable.

7. A receptacle according to claims 3, 4 or 5, wherein the adaptor housing includes a front portion which is distinct from the rear portion of said adaptor housing and which is fixed to the rear portion, with said rear portion being independent of said electrical device connected to the second intermediate connector.

8. A receptacle according to claims 3, 4 or 5, wherein the base includes a shutter for shutting the first intermediate connector.

9. A receptacle according to claims 3, 4 or 5, wherein said electrical device is a connector accessible from the outside.

10. A receptacle according to claims 3, 4 or 5, wherein said electrical device is a cord connected to an external apparatus.

11. A receptacle according to claims 3, 4 or 5, wherein said electrical device is a sensor.

12. A receptacle according to claims 3, 4 or 5, wherein the base includes three-slot insulation-displacement contacts and conductors connected to said first intermediate connector, each insulation-displacement contact being adapted to receive a conductor connected to the first intermediate connector and a conductor of the cable, and each insulation-displacement contact being further adapted to receive a branch connector going to another receptacle.

13. A receptacle according to claim 12, wherein the conductors of the cable are fixed to a cap-tool which facilitates installing them on the base.

14. A receptacle according to claim 1, wherein the cable includes a screen drain, and said receptacle includes conduction means connecting said cable screen drain to the electrical device.

15. A receptacle according to claim 14, wherein the base and the adaptor housing are assembled together by screws, and said conduction means comprise a screw, a corresponding bushing, and an insulation-displacement contact in contact with said bushing, said cable screen drain being connected to said insulation-displacement contact and a conductor connecting the screw to said electrical device.

* * * * *